INVENTOR.
FRITZ K. PREIKSCHAT

INVENTOR.
FRITZ K. PREIKSCHAT

Dec. 3, 1963  F. K. PREIKSCHAT  3,113,315
PHASE COMPARATOR MICROWAVE ENERGY DIRECTION FINDER
Filed June 12, 1961  3 Sheets-Sheet 3

INVENTOR.
FRITZ K. PREIKSCHAT
BY
Reynolds & Christensen
ATTORNEYS

United States Patent Office 3,113,315
Patented Dec. 3, 1963

3,113,315
PHASE COMPARATOR MICROWAVE ENERGY
DIRECTION FINDER
Fritz K. Preikschat, Bellevue, Wash., assignor to The
Boeing Company, Seattle, Wash., a corporation of
Delaware
Filed June 12, 1961, Ser. No. 116,547
7 Claims. (Cl. 343—113)

This invention relates to an improved technique for measuring phase angle between equal-amplitude oscillations of the same frequency, and more particularly concerns an improved apparatus for direction finding using wave energy receiving apparatus. The invention is herein illustratively described by reference to the presently preferred embodiment thereof; however, it will be recognized that certain modifications and changes therein with respect to details may be made without departing from the essential features involved.

An important object of this invention is to provide devices of the kind mentioned which are adapted for direct use with data storage and read-out systems, particularly those of the digital type.

A related object is to provide such apparatus capable of substantially instantaneous response, and of operating with energy applied in brief pulses, whereby the system is useful in direction-finding radar receiver equipment and similar applications.

In general terms, the invention comprises essentially an interferometer-type phase comparator which in its preferred embodiment measures the angle of incidence of propagative wave energy upon a receiving antenna array. Accordingly relative propagation direction is determined by measuring electrical phase displacement existing between signal energy received in each of two transversely spaced antenna elements, resulting from the difference in electrical length of the energy propagation paths from the remote energy source.

One preferred application of the invention is in ground-based aircraft landing control systems. In such systems each airplane may carry its own energy source or may constitute a reflector of energy incident upon it from a ground transmitter. In either case energy incident on the two receiving antennas preferably is reduced in frequency by superheterodyning the same in receiver circuits which retain the relative phasing of the received signals, or substantially so, for application respectively to opposite ends of a transmission line or guide of substantially a half electrical wavelength (or whole number multiple thereof). Terminated in substantially its characteristic impedance at both ends, this transmission guide sustains a standing wave pattern of energy the minimum or null point of which is positioned along the length of the guide in accordance with the incidence angle of the received energy. Means connected to the guide at each of successively spaced points therealong measure the relative position of the null point with respect to the individual pulse signals from different airplanes in the system field, and thereby the relative directions from the receiving station to such airplanes.

In accordance with still other features of the invention a plurality of energy detectors are coupled to the guide at successive spaced points along the length thereof and these in turn are connected to the inputs of amplifiers controlling the stages of a binary storage system above the stage representing the least significant binary figure. The stage storing least significant binary place data is controlled by the voltage relationship which exists between odd-digit and even-digit energizing buses. Alternate amplifiers have load electrodes connected to the odd-digit bus, whereas the remaining amplifiers have corresponding load electrodes connected to the even-digit bus, in respective amplifier energizing circuits which include a primary energy source, a common load resistance connected between one side of said source and the particular bus, and an individual load resistance connected between the opposing load electrode of each amplifier and the opposite side of said source. By causing the load currents of the amplifiers to flow through the common load resistances during periods between energy applications to the transmission guide, when a standing wave is produced on the guide, cutting off current flow in substantially all of the amplifiers except that energized by the particular detector coupled to the null point on the guide, most of the load current flows through the particular amplifier so as to produce a strong output signal for operating the binary storage apparatus.

These and other features, objects and advantages of the invention will become more fully evident from the following description of its presently preferred embodiment by reference to the accompanying drawings.

Figure 1:
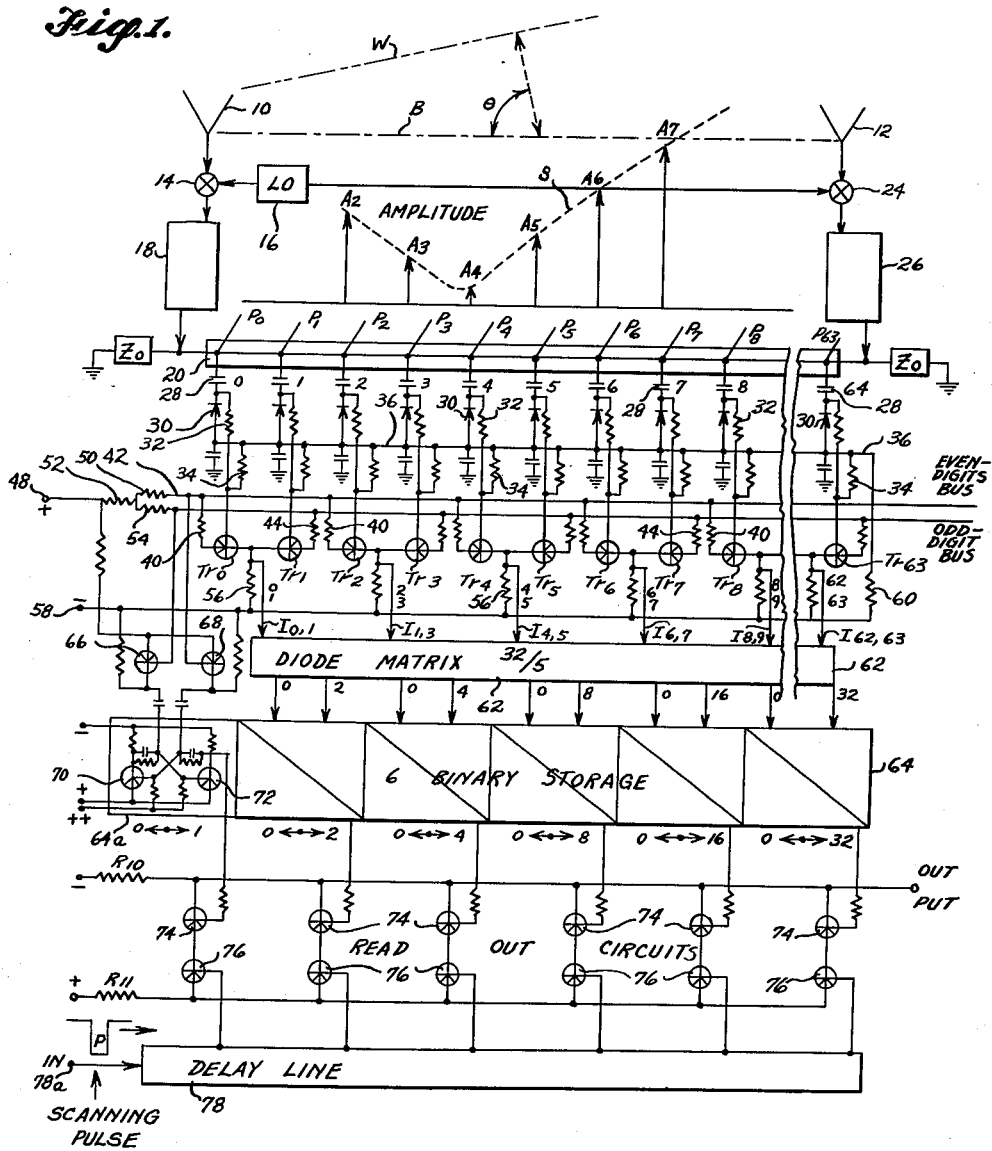
FIGURE 1 is a schematic diagram of the invention applied to direction finding using a pulse read-out.

Referring to FIGURE 1, antennas 10 and 12 are arrayed with predetermined transverse spacing therebetween along a common base line B. The distance between these antennas in terms of electrical wavelength of incident microwave energy determines the angular resolving power or directional sensitivity of the system, the greater the distance the greater the sensitivity. However, the greater the distance the lesser the total range of nonambiguous measurement for which the system is capable, inasmuch as the electrical phasing between the signals received by the two antennas from a common remote source with change of incidence angle cycles through $2\pi$ radians during a smaller change of incidence angle with a large spacing between antennas than it does with a small spacing between them. For this reason, as later explained, a coarse detector may be combined with a vernier detector in order to achieve measurement precision and large measurement range.

The received energy from antenna 10 is reduced in frequency in a mixer 14 fed by local oscillator 16. The resultant intermediate-frequency signal is amplified in intermediate frequency amplifier 18 and is applied to one end of a transmission line or guide 20 of an electrical length equal substantially to one-half wavelength at the intermediate frequency. Similarly, the signal from antenna 12 is reduced in frequency by the signal from local oscillator 16 applied to mixer 24 energizing the intermediate-frequency amplifier 26 the output of which is fed to the opposite end of the guide 20. Each end of the guide is terminated in its characteristic impedance $Z_0$ as shown, which may include the output impedance of the intermediate-frequency amplifier. By appropriate circuit design the original phase difference existing between the signals received by antennas 10 and 12 is preserved through the mixers and IF amplifiers and can be maintained at the output of these amplifiers with an accuracy of approximately three electrical degrees in practical production apparatus. This original phase difference of the signals is a function of the path-length difference from the remote energy source (i.e., such as an aircraft to be landed) to the respective antennas 10 and 12 at the particular incidence angle θ at which the wavefront W approaches the array reference line B. With this degree of accuracy, it is practical to measure the phase difference, hence the incidence angle, in sixty-four increments of approximately 5.6 degrees each, throughout a total of $2\pi$ radians of difference. As later explained herein, use of a binary digital storage and read-out system in performing the measurement function requires six binary digit places in order to provide sixty-four increments in the measurement range. It will be recognized that the incident energy received by the antennas 10 and 12 may be continuous-wave energy or may occur as a succession of pulses.

In a typical case the intermediate frequencies will be in the range of 100 megacycles per second. The output stages of the intermediate-frequency amplifiers have limiters which assure that the amplitudes of the signals fed to respectively opposite ends of the guide 20 have the same amplitude. Inaccuracies in phase measurement occur if the amplitudes differ from each other. The signals from the respective amplifiers travel along the guide 20 in opposite directions and interfere mutually in order to produce a standing-wave pattern having a null point, such as at position A4, determined by the point along the guide at which the phases of the waves are opposite each other. This standing-wave pattern represents the variation in intensity of energy stored by the line at different points along its length.

With the chosen example of sixty-four increments in the measurement scale, sixty-four pick-off points $p$ are distributed along the length of the guide 20 at substantially equal intervals. Each of these comprises a coupling condenser 28 connected in series with a diode 30, which may comprise part of the distributed impedance of the line or guide 20. The junction between each condenser 28 and diode 30 is connected through series resistances 32 and 34 to a common bus 36 which bus is grounded electrically through a capacitance 38 at each point of connection.

The energy detectors (28, 30), (32, 34) are connected to the base of separate transistor amplifiers $T_{r0}$, $T_{r1}$, $T_{r2}$ . . . $T_{r63}$, corresponding to the sixty-four different measurement points in the system. The emitters of alternate transistors are coupled through a resistance 40 to a so-called "even-digit energizing bus" 42, whereas the emitters of the remaining transistors are connected through resistors 44 to the so-called "odd-digit energizing bus" 46. The bus 42 in turn is connected to the positive voltage source terminal 48 through bus resistance 50 and a resistance 52, whereas the bus 46 is similarly connected to terminal 48 through a bus resistance 54 and the resistance 52. Thus, the resistances 50 and 52 represent common load resistances for the alternate transistors $T_{r0}$, $T_{r2}$, $T_{r4}$, etc., whereas the resistances 54 and 52 constitute a common load resistance for the remaining transistors. The collectors of each succeeding pair of transistors are commonly connected through the individual load resistances 56 to the opposite or negative energy source terminal 58.

When no signal is received by the antennas 10 and 12 the transistors all carry a low current which preferably may be of the order of 0.5 milliamp., adding up in all the transistors to approximately 30 milliamps. through common resistance 52. The appropriate transistor bias voltage is established by connecting the bus 36 to the negative source terminal 58 through the resistance 60. Typically the supply voltage between terminals 48 and 58 may be 20 volts and the voltage drop across resistance 52 and resistance 50 (or 54) may be about 10 volts under appropriate bias conditions. When a signal is applied to the guide 20 a standing wave builds up along the guide to energize the detectors 30 and thereby apply cut-off bias to all transistors $T_r$ except the one (or few) which are connected to the guide at the voltage null or minimum point along the guide. This transistor will remain conductive and will then assume most of the total current (i.e., approximately 30 milliamps.) carried previously by all of the transistors. In FIGURE 1, transistor $T_{r4}$ will carry the greatest current with the assumed standing wave pattern and will transmit a pulse (or continuous signal in the case of CW operation) to the diode matrix 62 for appropriate application to the binary storage system 64 as shown.

The least significant binary figure, "0" or "1," is determined by the voltage relationship existing between the buses 42 and 46, as a result of the change of current occurring in the transistors with a standing wave on the guide 20. A pair of amplifier transistors 66 and 68 having their bases connected respectively to buses 42 and 46 control the first binary storage stage 64a in accordance with said voltage relationship. This first binary stage comprises a trigger circuit including transistors 70 and 72, with the collector of each connected to the base of the other and to the outputs of the respective amplifiers 68 and 66.

Assuming transistor $T_{r4}$ to be more conductive than adjacent transistors in the same series, it will carry more current than transistors $T_{r3}$ and $T_{r5}$ combined, which will cause the even-digit bus 42 to be more negative in potential than the odd-digit bus 46. The voltage between these buses is sensed in amplifiers 66 and 68 and causes the latter to transmit a positive signal to transistor 70 in the binary stage. Transistor 70 is thereby rendered nonconductive and transistor 72 conductive. Collector voltage resulting in the latter is carried over the read-out transistor 74, biasing the latter so as to prevent its operation when a read-out or scanning pulse applied to delay line 78 at input 78a reaches the point at which switching transistor 76, in series with transistor 74, is connected to the line. However, in the event the null point on guide 20 is nearest an odd-digit position, the odd-digit bus 46 will carry a more negative potential than bus 42 and cause tarnsistor 72 to be rendered conductive. This applies a high negative bias to transistor 74 permitting it to conduct when transistor 76 is momentarily energized by the scanning pulse traveling on delay line 78. The digit place readings of higher significance in the binary system are obtained in the same manner by energization of the different binary stages through the diode matrix 62. Details of a system for responsively utilizing the read-out signals delivered by transistors 74 are not illustrated herein since they may be conventional or subject to variation within the present state of knowledge in the art, and are not necessary to an understanding of the present invention.

Figure 2:
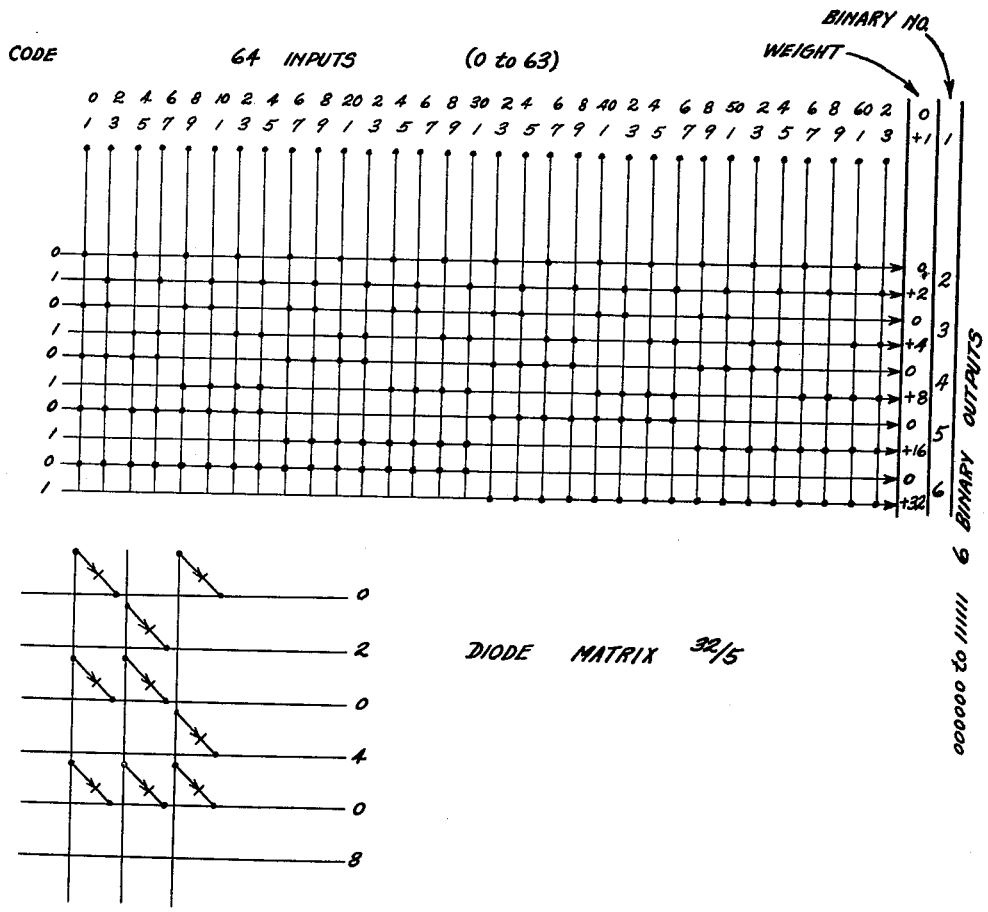
FIGURE 2 is a matrix diagram applicable to conversion of the amplifier outputs to signals which control five stages of a six-stage binary storage system.

The diode matrix by which the necessary transfer functions are accomplished for selective energization of the binary storage system 64 is diagrammed in FIGURE 2. This matrix follows the conventional binary code. For example, when a transistor $T_r$ in location 4 or 5 is most conductive it will produce a positive pulse which is transmitted over input $I_{4,5}$ into the matrix. In the example, this pulse sets the remaining five binaries (i.e., the least significant binary being set by the voltage relationship of buses 42 and 46) at the "01000" condition through the matrix diodes, so that the read-out pulse train, produced by scanning the switching transistors represents the value "001000," which is the number "4."

Figure 3:
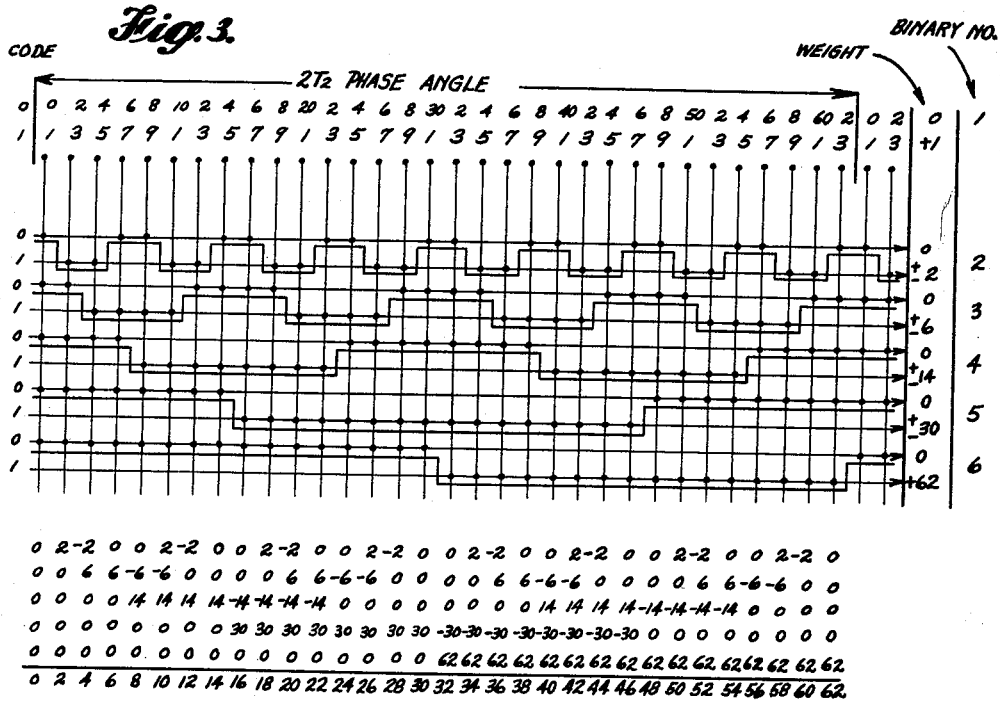
FIGURE 3 is a matrix diagram illustrating the manner in which this conversion may be applied using the so-called Gray binary code.

The conventional binary code used in a phase angle measurement system in which the angle changes by more than $2\pi$ radians is subject to ambiguity at the point of transition from a value of $2\pi$ to zero. At this point any of the six binary stages may read either "0" or "1." To avoid this ambiguity the Gray binary code may be used, as represented diagrammatically in FIGURE 3. The Gray code is well known in mechanical encoders and its application to the matrix system of the illustrative apparatus in this case will be evident to those familiar with digital computer systems generally. With the Gray system, every bit or step changes the reading of one binary at a time, and the transition point for every binary reading (i.e., between "0" and "1") is located in the center of a row of constant readings ("0" or "1") of the next lower significant binary place. Thus the weight of every binary will have to be added to or subtracted from the whole sum registered. For instance, at the input of null point 42 along guide 20 the binaries will read "011111" and have a weight of 0, 2, 6, 14, 30 and 62. However, the result is obtained from the operation 0+2−6+14−30+62=42. The Gray code transmission is not different from the conventional binary code, of course, since the binary digits "0" and "1" are used in both cases, but a more complicated read-out apparatus is required for the Gray code. There are certain advantages to the Gray code primarily affecting reliability under weak signal conditions which offer incentive for its use in certain cases despite the more complex circuitry required.

Figure 4:
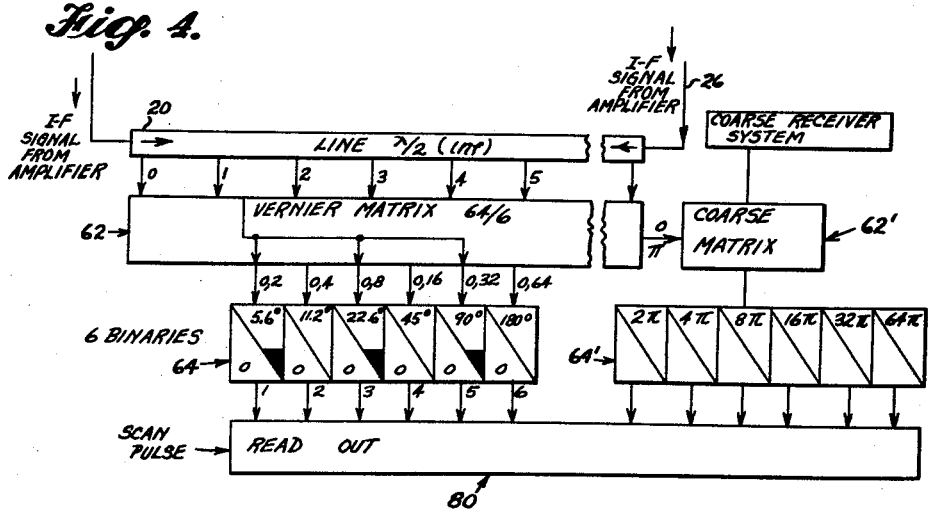
FIGURE 4 is a block diagram illustrating application of the invention to a direction-finding or phase comparator system employing both a coarse and a vernier section in order to provide greater accuracy within a given total measurement range.

In FIGURE 4 the basic system shown in FIGURE 1 functions as a vernier direction finder in cooperation with a similar system functioning as a coarse direction finder of greater angular range though of lesser accuracy. This coarse system comprises a coarse receiver system similar to that employed in FIGURE 1, but with reduced spacing between its receiving antennas, a coarse matrix 62' operated by the receiver system, and a coarse binary storage unit 64' wherein the coarse angular data is stored. The two binary storage units 64 and 64' may be interrogated by a common read-out unit 80 similar to that in FIGURE 1 in order to deliver the binary digital output data which includes the vernier data from storage unit 64 and the coarse position data from storage unit 64'. In such a combined system the binary places of the vernier unit may represent a total range of $2\pi$ radians, whereas those of the coarse unit may represent a total range of $128\pi$ radians on the same scale of direction angle sensitivity. In a typical case the total angular range of the system (i.e., the angular range of the coarse system) may be of the order of 25 degrees with an antenna base length of about 2.5 electrical wavelengths.

These and other aspects of the invention will be evident to those skilled in the art referring to the above description of the invention in its presently preferred embodiment.

I claim as my invention:

1. A wave energy phase comparator operable at a predetermined frequency, comprising a transmission guide having an electrical length equal substantially to a half wavelength at said frequency, two equal-amplitude sources of microwave energy connected respectively to opposite ends of said guide and subject to variations of phase relationship to be measured, said guide being terminated with substantially its characteristic impedance at both ends, whereby standing waves develop along said guide producing a null positioned lengthwise of the guide in accordance with the phase relationship existing between said sources, and measuring means operatively associated with said guide and operable substantially simultaneously to sample and compare the standing wave values at different points along the guide's length to determine thereby the position of said null along the guide's length as a measure of said phase relationship.

2. The microwave phase comparator defined in claim 1, wherein the measuring means comprises a series of energy detectors respectively coupled to the guide for energy detection by said detectors at a succession of spaced points along the guide's length and means responsive selectively to energization of the individual detectors below a predetermined level, thereby to the detector coupled to the null point along the guide.

3. The phase comparator defined in claim 2, wherein the measuring means further comprises a plurality of amplifiers having inputs to which at least certain of the detectors are connected respectively, a primary source of energizing current for said amplifiers, an energizing circuit for each amplifier including one side of said source, a common load impedance connected between said one side of the source and corresponding load electrodes of all of said amplifiers, and individual load impedances connected between opposite load electrodes of each of said amplifiers and the opposite side of said source, with relative polarities producing amplifier load current flow in all of said amplifiers energized below a predetermined value by their respective detectors.

4. The phase comparator defined in claim 2, wherein the measuring means includes a binary digital storage and read-out system, including a first binary stage for the least significant binary figure, and wherein the measuring means further includes a plurality of amplifiers having inputs to which the respective detectors are connected in successive order, an even-digit energizing bus to which corresponding load electrodes of alternate amplifiers in the succession are connected, an odd-digit energizing bus to which corresponding load electrodes of the remaining amplifiers are connected, a load circuit for said alternate amplifiers including a primary energy source having one side connected to said even-digit bus through a first common load impedance and having its opposite side connected to the opposing load electrodes of said alternate amplifiers through load impedances individual thereto, a load circuit for said remaining amplifiers including a primary energy source having one side connected to said odd-digit bus through a second common load impedance and having its opposite side connected to the opposing load electrodes of said remaining amplifiers through load impedances individual thereto, and wherein said first binary stage has two control inputs, corresponding respectively to a "0" and a "1" in the least significant binary figure, one such control input being connected to the even-digit bus and the other to the odd-digit bus.

5. A direction-finding microwave apparatus operable at a predetermined frequency, comprising a transmission guide having an electrical length equal substantially to a half wavelength at a frequency related to said frequency, two receiving antennas mounted in an array and electrically connected respectively to opposite ends of said guide to energize the same with energy having a phase relationship determined by the angle of incidence of microwave energy upon the array, said guide being terminated with substantially its characteristic impedance at both ends, whereby standing waves develop along said guide producing a null positioned lengthwise of the guide in accordance with said phase relationship, and measuring means operatively associated with said guide and operable substantially simultaneously to sample and compare the standing wave values at different points along the guide's length to determine thereby the position of said null along the guide's length as a measure of said angle of incidence.

6. The microwave phase comparator defined in claim 5, wherein the measuring means comprises a series of energy detectors respectively coupled to the guide for energy detection by said detectors at a succession of spaced points along the guide's length and means responsive selectively to energization of the individual detectors below a predetermined level, thereby to the detector coupled to the null point along the guide.

7. The phase comparator defined in claim 6, wherein the measuring means includes a binary digital storage and read-out system, including a first binary stage for the least significant binary figure, and wherein the measuring means further includes a plurality of amplifiers having inputs to which the respective detectors are connected in successive order, an even-digit energizing bus to which corresponding load electrodes of alternate amplifiers in the succession are connected, an odd-digit energizing bus to which corresponding load electrodes of the remaining amplifiers are connected, a load circuit for said alternate amplifiers including a primary energy source having one side connected to said even-digit bus through a first common load impedance and having its opposite side connected to the opposing load electrodes of said alternate amplifiers through load impedances individual thereto, a load circuit for said remaining amplifiers including a primary energy source having one side connected to said odd-digit bus through a second common load impedance and having its opposite side connected to the opposing load electrodes of said remaining amplifiers through load impedances individual thereto, and wherein said first binary stage has two control inputs, corresponding respectively to a "0" and a "1" in the least significant binary figure, one such control input being connected to the even-digit bus and the other to the odd-digit bus.

References Cited in the file of this patent
UNITED STATES PATENTS 2,283,676    Kandoian _____ May 19, 1942

OTHER REFERENCES

Proceedings of the IRE, April 1962, pages 474–5.